Feb. 27, 1945.    W. J. MILLER    2,370,410
METHOD AND APPARATUS FOR MANUFACTURING POTTERY WARE
Filed Feb. 21, 1940    2 Sheets-Sheet 1
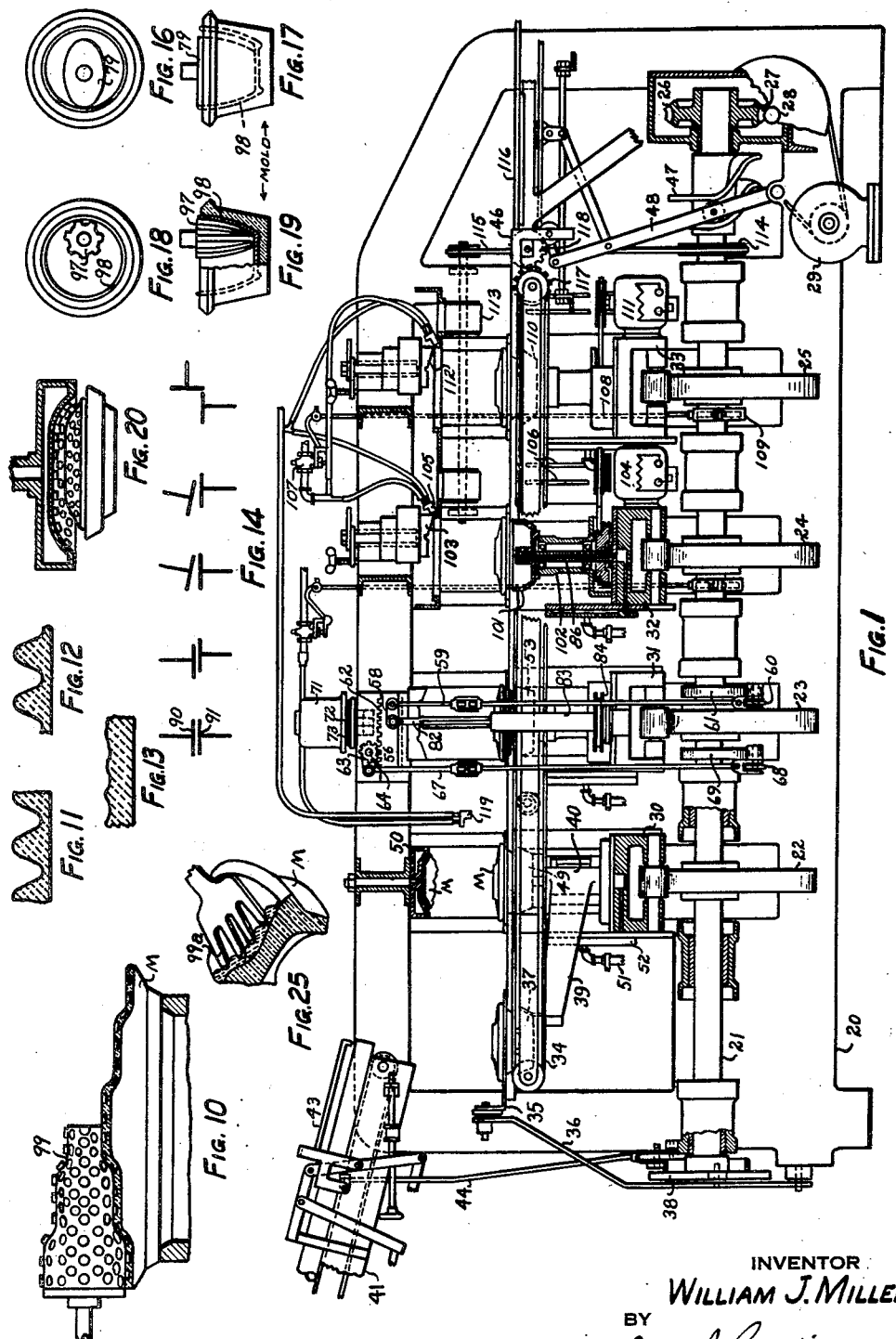
INVENTOR
WILLIAM J. MILLER
BY
ATTORNEY Feb. 27, 1945.  W. J. MILLER  2,370,410
METHOD AND APPARATUS FOR MANUFACTURING POTTERY WARE
Filed Feb. 21, 1940  2 Sheets-Sheet 2
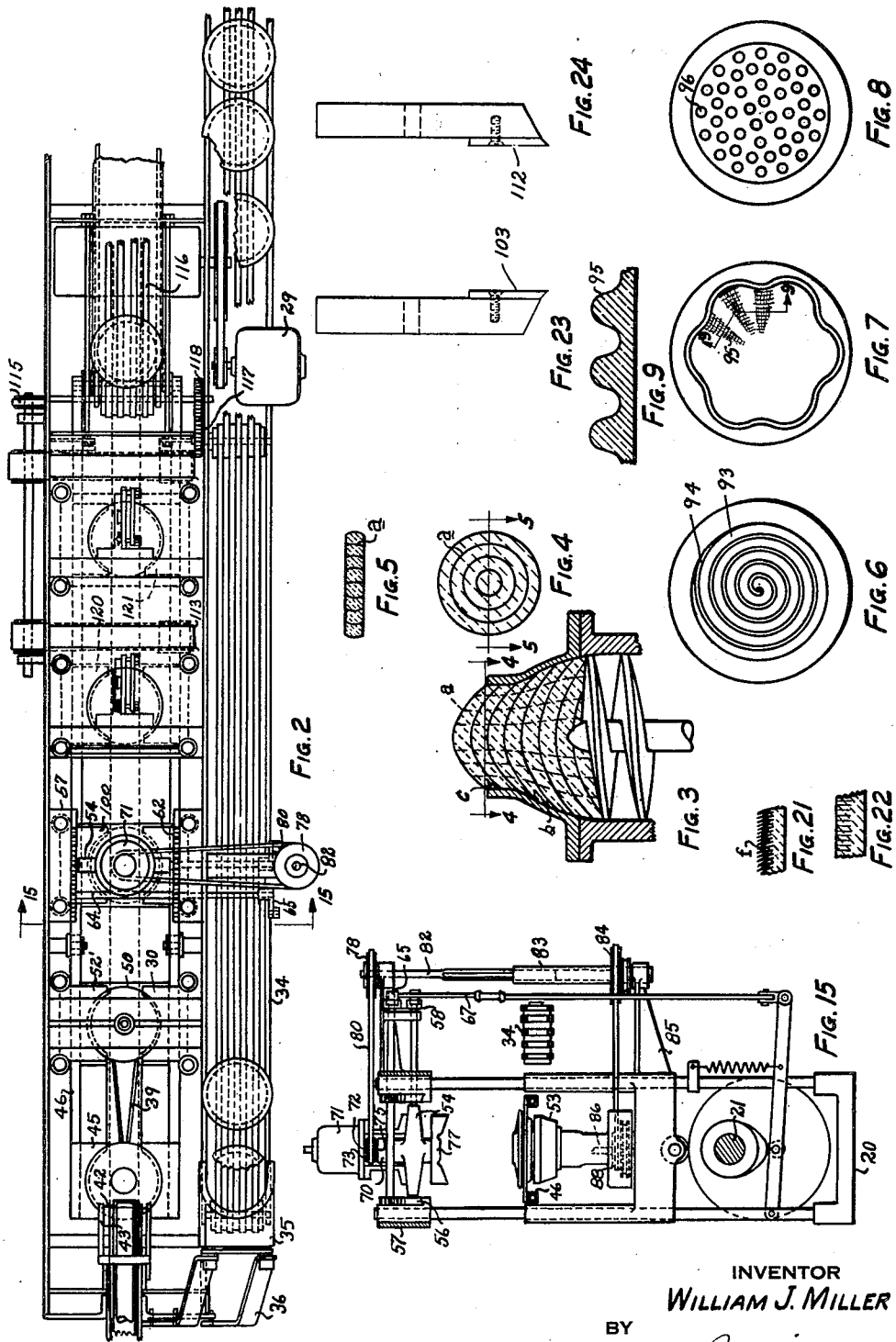
INVENTOR
WILLIAM J. MILLER
BY
ATTORNEY Patented Feb. 27, 1945

2,370,410

UNITED STATES PATENT OFFICE 2,370,410

METHOD AND APPARATUS FOR MANUFACTURING POTTERY WARE

William J. Miller, Swissvale, Pa.

Application February 21, 1940, Serial No. 320,007

21 Claims. (Cl. 25—22)

This invention relates to methods and apparatus for manufacturing pottery ware, particularly jiggered ware such as vitreous, semi-vitreous or earthenware plates, cups and saucers and the like.

Ware of this description is made from a plasticized mixture of compatible ceramic materials. In order to develop plasticity, a fluid slip is prepared by mixing the ingredients with water and then pumping the slip into a filter press, the solids being recovered in the form of a plastic cake. The cakes are mascerated in a pug mill and forced through an extrusion die by an auger, emerging in cylindrical columns and cut into slugs of convenient length for carrying. These slugs are the source of mold charges which are jiggered on a rotating plaster mold, dried and thereafter fired.

Preparation of the clay by the aforesaid mechanical methods introduces certain undesirable physical properties, for instance, longitudinal, transverse, or spiral laminations, strains, lumps, hard and soft spots, having a detrimental effect on the fabricating, drying and firing behavior thereof. Also, jiggering of the ware introduces certain additional strains and defects harmful to the manufacture of first grade ware.

Clay may be tempered and the workability thereof improved by wedging. This is a process of beating and working the clay into a homogeneous mass of substantially uniform consistency and destroying strains and laminations that cause warping and cracking in the dried or fired stage. This is usually done by hand with mauls after the clay is pugged, necessitating repugging and consequent reintroduction of certain strains, laminations, etc. The process is timestaking and expensive because of the labor involved. It is mostly practiced in the manufacture of very high quality ware such as china and porcelain.

The present invention is concerned with increasing the yield of first grade ware from a given amount of clay and improving the quality thereof, particularly ware made by mechanical jiggering processes. It is proposed to do this by taking steps to develop a more uniform consistency and plasticity in the clay prior to application to the mold and by wedging the clay mechanically upon application thereto.

Besides this, the invention aims to introduce the process of wedging with all the benefits of improved clay workability and low ware loss from warpage and cracking to mass production, particularly high speed manufacture by automatic machine. The advantages are thereby brought within the range of large scale popular priced semi-vitreous and earthenware production in a practical economical fashion, besides being a means of cost reduction and increased production of first grade ware.

In the manufacture of both semi-vitreous and vitreous ware there are many conventional steps in the process of manufacture necessary to the completion of the product once it has been fabricated according to the present teachings. These steps include finishing, bisque and glost firing, glazing, decoration, and the present invention shall be considered as encompassing that which is conventional in the art in these respects, unless otherwise indicated. The present invention therefore contemplates the manufacture of once fired or plural fired ware in plain or decorated shapes.

Other objects and advantageous features will be noted in the accompanying detailed description and drawings wherein:

Fig. 1 is an elevation partly in section of the preferred form of novel machine for carrying out the novel method.

Fig. 2 is a top plan view of the machine of Fig. 1.

Fig. 3 is a section through a pug mill showing the laminating effect of the screw on the column of clay.

Fig. 4 is a section taken on the line 4—4 of Fig. 3.

Fig. 5 is a section taken on the line 5—5 of Fig. 4.

Fig. 6 is a bottom view of a kneading die having a scroll ridged kneading surface.

Fig. 7 is a bottom view of a kneading die having a radial ridged kneading surface.

Fig. 8 is a bottom view of a kneading die having a kneading surface studded with irregularly spaced protuberances.

Fig. 9 is a section of the die of Fig. 7 looking in the direction of arrows 9—9 of Fig. 7.

Fig. 10 is a side elevation of a mold and horizontally pivoted kneading tool.

Figs. 11, 12 and 13 are three views showing the progressive stages in the kneading operation.

Fig. 14 is a series of five views diagrammatically showing various working positions of the kneading tools and the mold.

Fig. 15 is a view looking in the direction of arrows 15—15 of Fig. 2.

Fig. 16 is a top plan view of a cup mold and oval shaped kneading tool.

Fig. 17 is a side elevation of Fig. 16.

Fig. 18 is a top plan view of a mold and undulating surfaced cup kneading tool.

Fig. 19 is a side elevation of Fig. 18 with the mold partly broken away.

Fig. 20 is an elevation of a mold and oversize kneading die.

Fig. 21 is a view of a fragment of ware showing the effect of profiling on the surface thereof.

Fig. 22 is a view of the fragment of ware shown in Fig. 21 showing the effect of reversing the direction of rotation of the mold and re-profiling.

Figure 23 is an end elevation showing the bevel on the working surface of the profile tool and backing block.

Figure 24 is an end elevation showing a profile tool and backing block similar to that of Figure 23 but having a reverse bevel for use where the direction of rotation of the work is reversed over that of Figure 23.

Fig. 25 is a perspective view of a fragment of mold and another form of wedging tool.

In the preparation of the materials, the dry ingredients are ground fine and freed of lumps, then mixed with water and thoroughly agitated to develop a slip of uniform consistency. The slip is pumped into a filter press and the solid ingredients plasticized. It is desired not to vary the formula and treatment for successive batches once the optimum in this regard has been determined.

Conditions of temperature and pressure should be such as will promote as nearly as possible uniform plasticity and consistency throughout the entire body of the filter cake in order that only a minimum of material need be trimmed from the center and brim zones.

Filter cakes are inherently soft at the core and hard adjacent the brim, the more ideally useable portion being in between and of variable but not unsatisfactory plasticity. Instead of pugging the whole filter cake as it is customary to do, I propose to pug only the useable portion thereby improving consistency and uniformity in the pugged and extruded state. There is no waste to the process because the discarded clay is immediately blunged and used over again but in order to minimize the scrap, the cakes should be trimmed and pugged immediately because exposure to atmosphere has a hardening effect.

The filter cakes are cut up into segments by the knives and to some extent homogenized by extrusion through a compacting die but the extrusion is mainly a composite body of amalgamated clay segments of different shrinkage co-efficients and good results in fabricating, drying and firing cannot be expected. The physical condition is not improved by the presence of laminations, but the consistency thereof is benefitted by the absence of extremely hard and soft clay eliminated by trimming.

To improve plasticity and eliminate occluded air, it is preferred that the clay be pugged in a vacuum type mill, particularly one which shreds the clay. Shredding reduces any lumps remaining in the clay to small proportions.

After the clay is pugged and extruded, it is ready for application to the mold. While this may be done in the customary manual fashion, I prefer to cut through the column of clay across the long axis thereof and slice off mold charges that are thicker than the cross sectional thickness of the bat to be formed. The charge is deposited face down on the center of distribution of the molding surface and then spread out radially so as to completely cover the exposed portions of the molding surface. These operations may be done automatically as disclosed in my Patents #2,187,836 and Reissue #20,401.

The charge of clay when segregated usually contains laminations, some originally spiral, others transverse or longitudinal, depending on the design and pitch of the pug screw and the taper of the bore in the extrusion die. Figure 3 illustrates in a composite fashion how lamination lines may run in a column of clay, for instance, longitudinally as at $a$, in telescoping helical cones $b$ or in other forms and directions not specifically disclosed. Figure 4 shows how longitudinal laminations would appear looking at the face of a charge of clay cut off at right angles to the direction of extrusion and Figure 5 what they are apt to look like in cross section. The charge may also have peripheral fissures C which sometimes develop on the surface of the column incident to extrusion and may also contain invisible strains and stresses due to twisting moments imposed by the auger.

I prefer to spread out the material on the mold and bond it thereto with a die having a press surface co-extensive with the mold as disclosed in Patent #2,114,254. Spreading the material as aforesaid stretches out the lumps and laminations increasing the spread or surface area thereof and making them easier to dispose of during the subsequent wedging operation. It is desired to spread the clay without highly compacting or densifying it so that the material will remain in a more easily wedgeable and plastic condition. Vacuumizing the clay incident to pugging improves the plasticity and makes it easier to spread. Spreading pressure may also be minimized by dividing the process into two stages as disclosed in my Patent No. 2,191,857, wherein the peripheral zone of the blank is spread after the center section is formed.

After the clay is spread out on and adhesively bonded to the molding surface of the mold, it is next wedged, this operation being performed by bringing into engagement with the clay, whilst the mold and clay are rotating, certain later described tools which knead the material and thereby develop therein optimum temper and workability. Laminations, strain lines, crevices, hard and soft spots, disappear under the kneading action and are replaced by an even textured, highly homogeneous mass of uniform consistency free of strains and other inequalities and undesirable physical properties which can cause so much trouble in drying and firing.

According to my process, the material is wedged with a gentle but no wise less effective action than the heavy beating and pounding which usually characterizes wedging as heretofore practiced. The layer of material is not thick nor of appreciable volume and being of improved plasticity is easy to work and not difficult to knead and furthermore, the mold is not constructed to withstand heavy blows.

It is preferred to wedge the material by working the clay up and down and back and forth the action angularly advancing around 360° of the circle of the ware with the zone of application shifting each revolution of the mold and being repeated until the clay is in optimum wedged condition. The action preferably starts with the deep penetration of the material, see Fig. 11, which may either be in a circumferential or radial or other direction, depending on the tool, and leaves the surface of the clay wavy as shown. On the next revolution, the zone of application shifts and the ridges of the undulations are depressed and the valleys raised, see Fig. 12. As the kneading continues, the depth of penetration is progressively diminished until near the end of the operation the surface is fairly smooth and in condition for jiggering, see Fig. 13.

If desired, between the step of wedging and profiling, the bat may be pressed with a die having a surface properly polished and contoured so as to smooth the surface of the bat, compact and densify the material, the latter improving the dried and fired strength of the product. It is desired that pressure during this operation be applied uniformly to the bat in order not to develop any strains in the material.

In profiling or jiggering, excess material is removed from the exposed surface of the blank, surface contours finally established, and the surface polished. Conventionally, this is done in a single operation with a bevel edged profile. Due to continued rotation in one direction, the drag of the profile tool tends to pull the clay in a direction counter to that of rotation, the condition being illustrated somewhat diagrammatically by lines f, Fig. 21. Surface fissures ranging from microscopic to those readily detectable by the naked eye may result in the ware becoming defective. Moreover, the treatment introduces torsional or helical strains into the material which may become sources or causes of defective ware.

I propose to eliminate these undesirable properties as causes of defective ware in the following manner: after initially profiling the ware, the mold is rotated in the opposite direction in engagement with a profile tool having a profiling edge tapered oppositely to that of the first profile tool. The second profiling is for the purpose of imposing a drag or pull on the material counter to that received during the first profiling operation, thereby closing up previously formed surface cracks or fissures, see Fig. 22, and relieving strains imposed by the first profile. Additionally, the surface of the clay is given a higher polish and it is preferred that a minimum of excess material be removed during the operation. The two stage profiling operation may, in a line production system, be subdivided between several stations. The optimum number of stations, speed of rotation, number of revolutions in contact with the tool, the period of time required for each profiling as well as treatment by heat, air, water, etc. will depend upon the character of the clay being worked, the shape of the ware and the capacity thereof to develop strains and other imperfections under normal profiling, together with the difficulty which may be encountered in eliminating them.

It is an aim to jigger as nearly perfect as possible first grade ware. This means that the thickness of the body should meet with predetermined specifications for the entire run of the production as well as the size of the articles and their general all-around excellence.

I have found that the molds and chucks are usually responsible for a lack of uniformity in these respects.

In regard to the chucking provisions, I prefer to seat the mold on a perfectly true running, dynamically balanced chuck rotating on precision bearings driven by a vibrationless transmission or means such as helical gears or a V belt, or direct by adjustable speed motor and securely mounted so there is no vibration to either mold or profile tool.

Upon the completion of jiggering, the mold and ware is placed in a dryer and allowed to remain in a warm congenial atmosphere until such time as the ware has dried properly and released from the mold.

In the case of cups or ware requiring appendages, the product is removed from the mold when substantially leather hard and the appendage stuck thereto with slip and the product dried for a further interval.

The preferred apparatus is shown in Figs. 1 and 15 as comprising a frame 20, having a cam shaft 21 on which are keyed a press-feed cam 22, kneading cam 23, jigger cam 24 and polishing cam 25. The cam shaft is rotated by gear 26, worm 27, shaft 28 and motor 29. In some respects, this machine is comparable to that shown in my Patent No. 2,187,836.

Associated with each cam is a reciprocable crosshead numbered from left to right 30, 31, 32 and 33 respectively. Each crosshead supports a pedestal and a removable mold chuck.

Empty molds are placed in single file on conveyor 34, Fig. 2, and intermittently moved to the left into a transfer fork 35 attached to parallel levers 36 reciprocated between the conveyor and the feeding chuck 37 by a cam 38, see Fig. 1. Chuck 37 carried by a bracket 39 attached to pedestal 40 on crosshead 30 is raised by cam 22, lifting the mold out of fork 35 up to the feeder 41. A cutting wire 42 on pivoted frame 43 cuts through the column of clay when link 44 is raised, thereby segregating and depositing a charge face down concentric on molding surface of the plate mold shown or into the cavity of a cup mold. In the meantime, the transfer fork 35 has shifted back to original position and the seat 45 of transfer 46 has been shifted under chuck 37 so that the charged mold is deposited thereon when lowered. Transfer 46 is reciprocated by cam 47 and pivoted lever 48 connected to the machine frame 1 and the transfer 46.

Transfer 46 next shifts to the right moving the charged mold over press chuck 49 on pedestal 40. Seat 45 being longitudinally divided, chuck 49 rises therethrough lifting the mold M and elevating the charge of material into pressing engagement with a stationary die 50 adjustably mounted on the frame thereabove. The approach may be gradual and the dwell prolonged with a permeable die when compressed air is used to release the clay from the die, but quicker action is preferred when a heated die is employed to prevent case hardening the surface of the clay. The clay flows radially over the molding surface to predetermined diameter and thickness. Vacuum is preferably applied to the chuck cavity during pressing through line 51 and slide valve 52 to secure the mold to the chuck.

During the interval of pressing, the transfer 46 shifts to the left bringing seat 52' under the mold in the elevated press chuck 49 and upon lowering thereof the mold is deposited in said seat and then shifted to the right over lowered wedging chuck 53.

At this station, I propose to wedge and normalize the material deposited on the mold by means of kneading implements such as those shown in Figs. 6, 7, 8, 9, 10, 16, 17, 18, 19, 20 and 21, and have provided means for imparting appropriate motion thereto.

Figs. 1, 2 and 15 show apparatus for supporting and actuating the various wedging tools comprising a shaft 54 extending transversely of the machine rotatably journaled in bearings located in parallel longitudinal slides 56 in the frame members 57. The shaft 54 extends beyond the right frame member, Fig. 15, and has a crank 58 pivotably connected through adjustable linkage 59 to lever 60 pivoted to the frame and actuated by cam 61 mounted on shaft 21. The cam may be contoured so as to tilt the wedging tool through any desired degree. To shift the wedging tools off center, the slides 56 are provided with gear teeth 62 and pinions 63 in mesh therewith and are secured to a common shaft 64 journaled in the frame. The end of shaft 64 has a crank 65 which is oscillated through adjustable linkage 67, cam lever 68 pivoted to a lower frame member cam 69 of proper contour mounted on the shaft 21.

The shaft 54 has secured thereto a housing 70 supporting a motor 71 with a shaft 72 having a sheave 73 thereon. Extending axially of the shaft 72 and journaled in housing 70 is a stub shaft 75 coupled to shaft 72 and having a wedging tool 77 removably mounted on the lower end thereof. Sheave 72 drives wedging chuck 53 through belt 80 and sheave 78 secured to shaft 82 in spline sliding engagement with a shaft 83 keyed to a multiple cone sheave 84 mounted on a bracket 85 carried by the wedging crosshead. The chuck 53 is mounted on spindle 86 journaled in pedestal such as that shown at 102, Fig. 1, and having a cone sheave 88 secured thereto. V belts transmit motion therebetween. By means of this drive arrangement, the chuck 53 may be driven in synchronism with the wedging tool. The speed of rotation of either one or both may be varied or the wedging tool may be disconnected from the drive and rotated through contact with the work.

Fig. 14 illustrates diagrammatically some of the various operative positions which may be obtained with the apparatus aforesaid, the numeral 90 indicating the wedging tool and the numeral 91 indicating the mold and chuck. The wedging tool may be rocked from side to side and/or moved horizontally and/or vertically during wedging. Also, it may be rotated intermittently or continuously and the mold may be reciprocated vertically during the kneading operation, it being possible to contour the cams to obtain the desired operation.

Fig. 6 shows a flat ware wedging tool 92 in the form of a die having a contoured surface 93 with a projecting scroll-like ridge 94 thereon. Fig. 7 shows the contoured surface of the die as being radially ribbed as at 95, the ribs being as shown in Fig. 9 and forming an undulatory surface. Fig. 8 shows the contoured surface as being a plurality of protuberances 96 which may or may not be formed in an undulatory surface such as that shown in Fig. 7.

It is desired in flat ware dies that the circumference of the wedging surface be greater than the circumference of the molding surface as shown in Fig. 20. It is also preferred that the wedging tool be rotated about an axis inclined to that of the mold as disclosed in the middle diagram in Fig. 14. Contact between the kneading surfaces of the wedging tool and the work is preferably along a radial line, there being no overall contact as would occur if the wedging surface of the tool fitted the molding surface and both were co-axially rotated. It is desired also that the primary point of contact of the kneading surface and the clay travel in circles of unequal diameter so that "tracking" will not occur in any two successive revolutions of the clay.

For hollow ware such as cups and bowls, the diameter of the tool 97, Fig. 18, is less than the diameter of the clay bat 98. The surface of this tool may be ridged as shown. Fig. 16 discloses an oval shaped tool 79 rotated about an axis off center with relation to the axis of the mold.

Fig. 10 discloses a wedging tool 99 which may have a wedging surface contoured in any desired fashion but is here shown as knobbed and of a diameter less than the diameter of the work. This tool may be presented at right angles to the axis of rotation of the mold as shown or in inclined position and the tool may be shifted or actuated during working.

Tracking may also be prevented by withdrawing the mold and work from the tool periodically and re-engaging with the tool or by so moving the tool.

Another form of tool is shown in Fig. 25, the tines 99a of the tool being adapted to engage the clay and furrow it circumferentially as the mold is rotated. The tool may be given motion so as to vary the track of the furrows and it may be operated in conjunction with any of the other wedging tools hereinbefore mentioned. One or more of such tools may be utilized.

When kneading is completed, the mold is lowered and deposited in seat 100 of the transfer which has during kneading shifted to the left and is carried to the right over chuck 101 mounted on pedestal 102, then elevated into engagement with the profiling tool 103, Figure 23, and rotated by the motor 104 whilst fluid is sprayed thereon through nozzle 105. The motor is energized through contacts 106 when elevated to rotate the chuck. Fluid application control is through valve 107 opened by rod 108 operated through cam 109 mounted on shaft 21.

The ware and mold are next lowered into seat 120 and shifted over chuck 110 by the transfer, elevated and rotated by motor 111 against tool 112, Figure 24, this station being identical with the preceding station except that the jiggering edge of the profile tool has a bevel reverse to that of tool 103 and the mold is rotated in reverse direction. At both stations, scrap clay conveying belts 113 carry the excess clay to a suitable reconditioner. The belts are driven by a pulley 114 on shaft 21 and a belt 115.

The mold with the completed ware thereon is then shifted in seat 121 by the transfer to the conveyor 116 on which the molds are accumulated, pending transfer to a dryer. This transfer is operated synchronously with the empty mold conveyor through gears 117 and 118.

The surface of the clay may be moistened, if desired, at various points between stations by guns 119 during the travel thereof through the machine. Also, the kneading surfaces of the various wedging tools may be moistened prior to or during kneading either by making the face of the tools permeable or by external spraying. Lubrication will help maintain the clay in a wedgeable condition and will help prevent sticking. In cases where sticking is apt to be severe, the wedging tools may be heated to avoid the condition.

Having thus described my invention, what I claim is:

1. The method of making jiggered dinnerware which comprises, placing a slice of pugged clay on the molding surface of a plaster jigger mold, wedging the slice of clay on the surface of the mold and thereafter jiggering the wedged clay and during the jiggering operation reversing the direction of rotation.

2. The method of making jiggered dinnerware which comprises, placing a slice of pugged clay on the molding surface of a plaster jigger mold, wedging the slice of clay on the surface of the mold and thereafter jiggering the wedged material.

3. The method of making jiggered dinnerware which comprises, placing a slice of pugged clay on the molding surface of a plaster jigger mold, pressing the slice against the mold, wedging the pressed material and thereafter jiggering the wedged clay.

4. The method of making jiggered dinnerware which comprises, placing a slice of pugged clay on the molding surface of a plaster jigger mold, rotating the mold and wedging the slice of clay whilst being rotated and thereafter jiggering the wedged clay.

5. The method of making jiggered dinnerware which comprises, placing a slice of pugged clay on the molding surface of a plaster jigger mold, wedging the slice of clay thereon by relative movement between the slice and a wedging tool, and thereafter jiggering the wedged clay.

6. The method of making jiggered dinnerware which comprises, preparing a fluid mixture of ceramic materials, filter pressing the mixture, pugging the filter pressed material, cutting a slice of clay from the pugged material, laying the slice on the molding surface of a plaster dinnerware mold, wedging the slice of clay thereon, jiggering the wedged material, drying the same and thereafter firing it.

7. The method of making jiggered dinnerware which comprises, pugging filter pressed clay, cutting a slice of clay from the pugged material, laying the slice on a plaster jigger mold, pressing the slice to spread it over the ware forming surface, wedging the pressed material, profiling the wedged material, drying the same and thereafter firing it.

8. The combination in a jiggering machine of wedging and profiling mechanism.

9. The combination in a pottery jiggering machine of preforming, wedging and profiling mechanism.

10. The combination in a pottery jiggering machine of feeding, preforming, wedging and profiling mechanism.

11. The combination in a pottery jiggering machine of clay feeding, bat forming, wedging and profiling mechanism.

12. The combination in a pottery jiggering machine of wedging mechanism, profiling mechanism and mold transporting means.

13. The combination in a pottery jiggering machine of profiling mechanism and wedging mechanism, said wedging mechanism including a wedging tool and means for adjusting said tool relative to the work to thereby regulate the depth of penetration of the tool.

14. In a pottery jiggering machine, a rotatable mold, said mold being adapted to be charged with plastic ceramic material, wedging means for wedging said ceramic material, including a rotatable wedging tool and means for profiling said ceramic material.

15. In the manufacture of jiggered dinnerware, the method which comprises feeding a charge of clay to a jiggering mold, contacting the charge of clay with a spreading member to flow the clay over the ware-forming surface of the mold and thereafter kneading the clay to remove strains, jiggering the clay by relatively rotating the kneaded clay and a profile tool and removing strains set up in the clay by the profile tool by oppositely relatively rotating the mold and the profile tool.

16. In the manufacture of jiggered dinnerware, the method which consists in relatively rotating a bat of clay and a profile tool and thereafter reversing the direction of rotation in order to remove the strain set up in the clay occasioned by previous rotation in the other direction.

17. In the manufacture of jiggered dinnerware, the step of wedging the clay preparatory to jiggering after the clay has been bonded to the mold.

18. The method of making jiggered dinnerware which comprises, pugging filter pressed clay, cutting a slice of clay from the pugged material, laying the slice on a plaster jigger mold, wedging the slice of clay, pressing the same, jiggering the pressed material, drying it and then firing the same.

19. The combination in a jiggering machine of a mold support, a wedging tool, a movable mold on which clay is deposited carried by said support, means for relatively moving the wedging tool and support to effect a wedging operation and means for jiggering the wedged clay.

20. In a pottery jiggering machine, a movable mold to be charged with clay, a mold support, a movable wedging tool, means for relatively moving said wedging tool and mold support to effect a wedging operation on the clay carried by said mold, a press member, a profile member, a mold support associated with each member and means for relatively moving said members and said last named mold supports to press and profile the clay respectively.

21. In a pottery jiggering machine, a movable mold to be charged with clay, a mold support, a movable wedging tool, means for relatively moving said wedging tool and mold support to effect a wedging operation on the clay carried by said mold, a profiling means, a mold support therebelow, means for relatively moving said profiling means and said mold support to profile the wedged clay and means for carrying molds from one support to the other.

WILLIAM J. MILLER.